Figure 1:
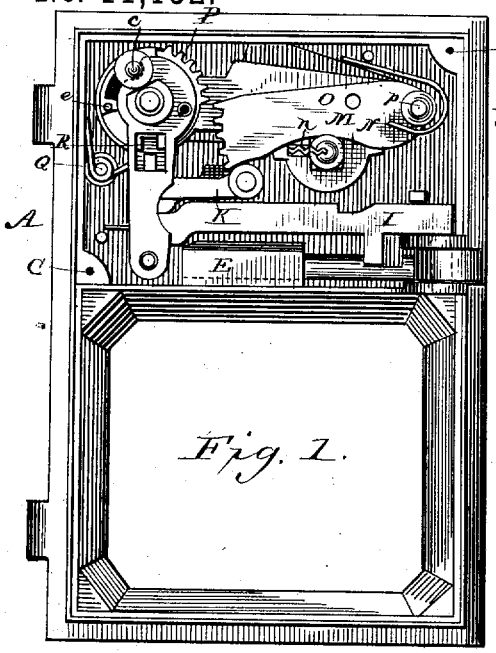

W. H. TAYLOR.

Assignor to THE YALE & TOWNE MANUFACTURING COMPANY.

LOCK.

No. 11,152. Reissued Mar. 17, 1891.

Witnesses

H. C. Newman

E. S. Newman.

Inventor

WARREN H. TAYLOR

By his Attorneys

Hopkins & Atkins.

W. H. TAYLOR. 2 Sheets—Sheet 2.
Assignor to THE YALE & TOWNE MANUFACTURING COMPANY.
LOCK.
No. 11,152. Reissued Mar. 17, 1891.
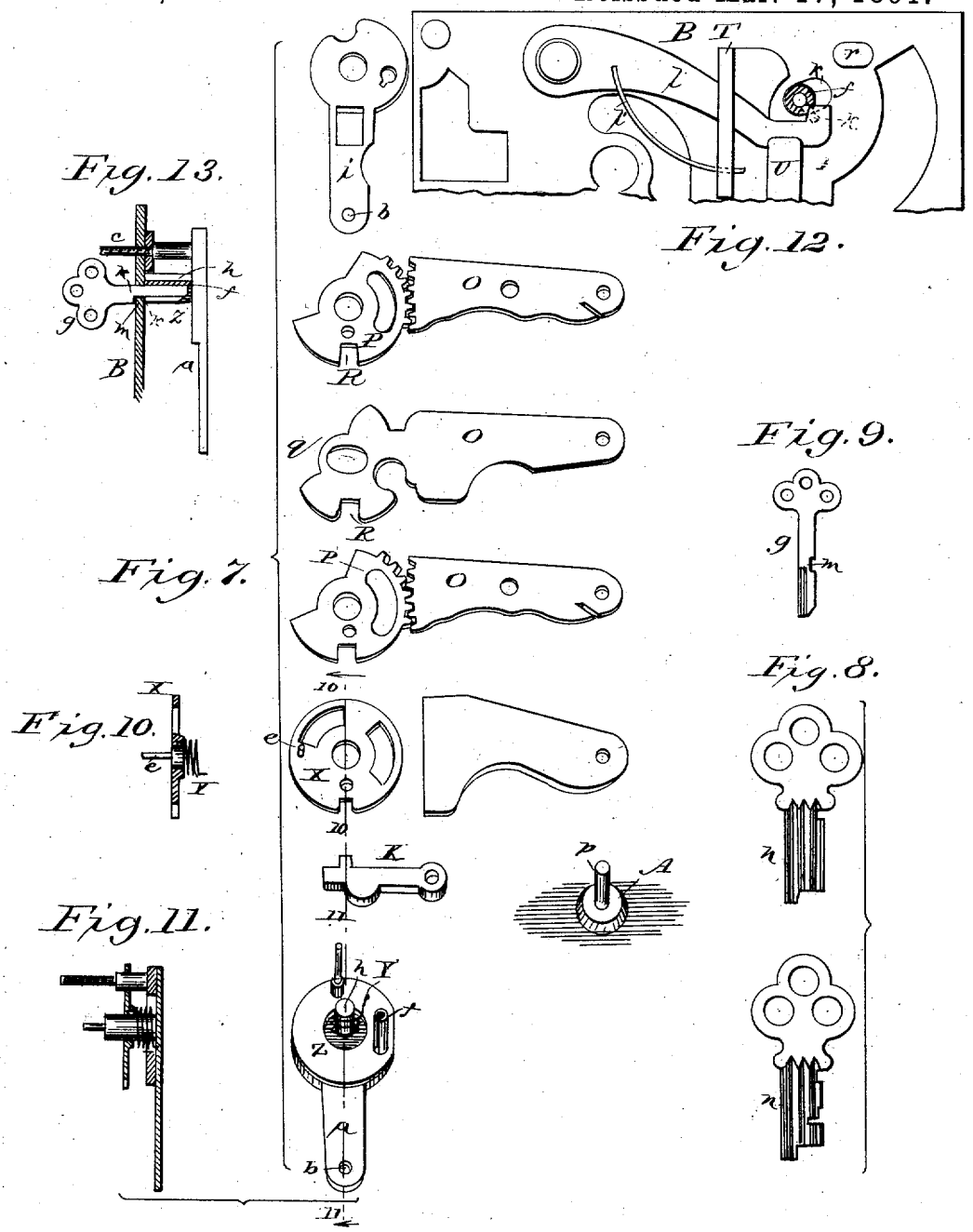
Witnesses
H. C. Newman.
E. S. Newman.
Inventor
WARREN H. TAYLOR.
By his Attorneys
Hopkins & Atkins.

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

LOCK.

SPECIFICATION forming part of Reissued Letters Patent No. 11,152, dated March 17, 1891.

Original No. 403,705, dated May 21, 1889. Application for reissue filed April 21, 1890. Serial No. 348,923.

*To all whom it may concern:*

Be it known that I, WARREN H. TAYLOR, of Stamford, in the county of Fairfield and State of Connecticut, have invented certain new and useful Improvements in Locks, of which the following is a specification, reference being had to the accompanying drawings.

My invention relates to that class of combination-locks in which the combinations can be set or changed only by the use of the lock-keys.

My invention consists in the organization of parts hereinafter described, and succinctly stated in my appended claims.

In order to illustrate my invention, I exhibit in the drawings an entire lock containing, of course, many parts that are old, but necessary to be shown in order to exhibit the structure and operation of my improvements and their proper relations to ordinary lock mechanisms when applied to use.

Figure 2:
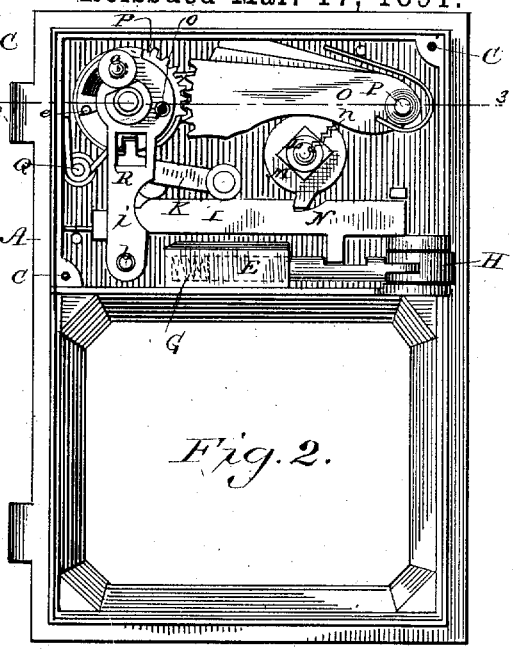
Figure 3:
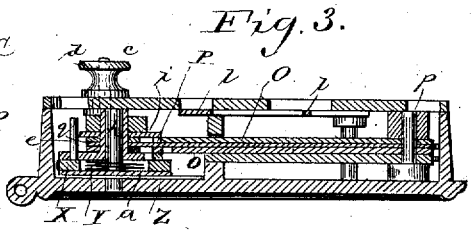
Figure 5:
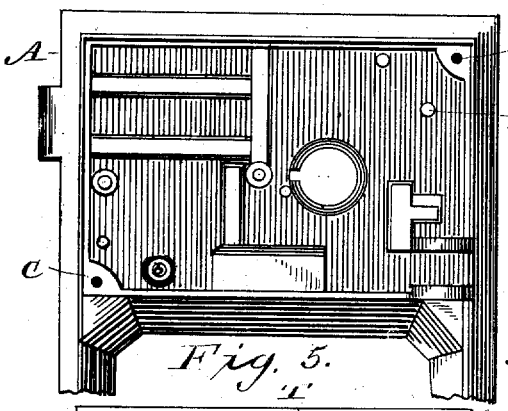
Figure 6:
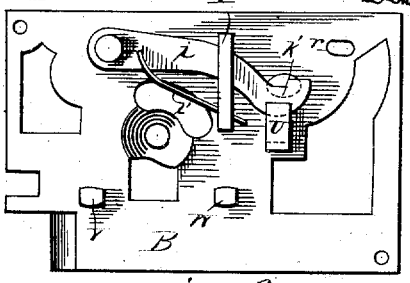
Figure 4:
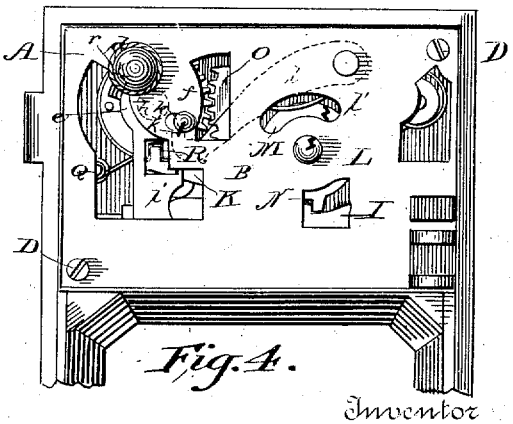

In the drawings, Figure 1 is a view of my improved lock, with the cap-plate removed, applied to a post-office-box door. This figure shows the two parts of the tumblers separated. Fig. 2 is a similar view showing the two parts of the tumblers engaged and the main lock-key turned into the position for unlocking. Fig. 3 is a section on the line 3 3 of Fig. 2. Fig. 4 is a view of the lock with the cap-plate in place. Fig. 5 is a view of the interior of the lock-case with the working parts removed. Fig. 6 is a bottom view of the cap-plate. Fig. 7 is a view of a group of parts separated into nine divisions, so as to show them individually in perspective. Fig. 8 is a view of two different main lock-keys. Fig. 9 is a view of an auxiliary key. Fig. 10 is a central section on the line 10 10 of one of the parts shown in Fig. 7. Fig. 11 is a central section on the line 11 11 of one of the parts shown in Fig. 7. Fig. 12 is an enlarged view of a portion of the bottom part of the cap-plate. Fig. 13 is a sectional view showing that the lock-plate has entered the notch in the auxiliary key, so that the key cannot be withdrawn.

A indicates a lock-case, and B a cap-plate. The case is provided with corner-lugs C C to receive the cap-plate fastening-screws D D. The case is also provided with a block E for containing the sliding bolt-rod F and its spring G, the rod being pivoted to the pivoted latch-bolt H, as shown.

I indicates a cam-slide for the purpose of operating the fence K (that has tongue $K^2$ to enter the tumbler-gatings) and for communicating its motion to the bolt-rod F and latch-bolt H.

L indicates the key-hub, and M the cam engaging with the cam-slide I by means of a lug N.

O indicates pivoted spur-geared spring-tumblers of ordinary construction, adapted to be turned on their pivots by the operation of the key.

P indicates the circular parts of the tumblers, which are provided with spur-gearing, as usual in this class of tumblers, composed each of two different parts geared together.

Q indicates a spring operating upon the fence, tending to keep its tongue $K^2$ out of engagement with the gatings R in the circular parts of the tumblers. The cap-plate of the lock is provided with lugs T U V W, for the purpose of bearing upon the internal movable parts of the lock and holding them in place.

All of the parts of the lock thus far mentioned are of usual construction and need not be further described.

Coming now to the peculiar parts of the lock that constitute my invention, it will be observed that the circular parts of the tumblers are mounted upon a carrier-plate X, which is actuated by a coiled spring Y. The carrier is in turn mounted upon an oscillating seat Z, having an arm *a*, by which it is pivoted to the case at *b*. The seat is provided with a post *c*, which extends through the cap-plate, and is provided with a thumb-nut *d*, serving as a handle for oscillating the movable parts described below. The carrier is provided with a post *e*, which engages with the circular parts of the tumblers and always tends to throw them around to the point where their gatings R are in alignment, as shown in Figs. 1 and 2. The seat Z is provided with a slotted key-post *f* to receive the auxiliary lock-key *g*.

*h* indicates a pivot-post rising from the center of the seat Z and serving as the axis of the carrier and the circular parts of the tumblers.

*i* indicates a covering-arm, which is pivoted at *b* and with the seat Z and post *h* constitutes what I may call a "pivoted frame" for oscillating the circular parts of the tumblers, the spring-carrier, the posts *c*, and the slotted key-post *f* by means of the thumb nut *d*.

*k* indicates a slot in the cap-plate to permit the oscillation of the key-post.

*k'* indicates a key-slot in the cap-plate.

*l* indicates a spring-latch, which is pivoted to the cap-plate and engages by the action of its spring *l'* normally with one wall of the slot in the key-post, and thereby holds the key-post and the pivoted frame and its parts just above mentioned to one side, so that the teeth of the different parts of the tumblers are engaged for operation.

It will be observed that the key *g* is tapered at its end. This is for the purpose of pushing back and disengaging the latch *l* from the key-post, which is done by the mere insertion of the key to place. Then (when the thumb-nut *d* is loosened) the parts of the tumblers are no longer locked together; but the circular parts of the tumblers, the key-post, and all the parts carried by the pivoted frame mentioned can be moved to one side, so as to disengage the parts of the tumblers. It will be observed, further, that the key *g* is notched at *m*. The result is that when the parts are pushed to one side, so that the tumbler-gears are disengaged, the edge of the cap-plate has entered this key-notch, as shown in Fig. 13, so that the key cannot be withdrawn. The object of this arrangement is that the auxiliary lock-key cannot be removed except when the gears of the parts of the tumblers are properly engaged and all the lock mechanism is in position to be operated by the main lock-key *n* for turning the key-hub L.

Between the tumblers, for the purpose of separating them, I provide a thin furring-plate *o*, secured in place by the tumbler-pivot *p* and the post *h*, as is usual in lock mechanism. In my lock, however, in order to accommodate the oscillating movements of the pivoted frame above mentioned and the parts it carries, I provide a slot *q* in the furring-plate, which receives the post *h*. The thumb-nut *d*, in addition to its function as a handle to move the post *c* to one side or the other in the slot *r* in the cap-plate, serves to hold the oscillating parts in place by being screwed down tightly against the cap-plate. I therefore have an additional means besides the spring-latch *l* for locking the two parts of the tumblers together.

The operation of my improvements for the purpose of changing the combination is as follows: Suppose both of the keys to be out of the lock and it was desired for some reason to change the combination of the lock so as to use a new main lock-key. The first thing to do would be to insert the auxiliary lock-key in its post and unscrew the thumb-nut *d*. This would disengage the fastenings which hold the different parts of the tumblers in engagement. Then by pushing the thumb-nut on one side the circular parts of the tumblers will be swung out of engagement with the spring-actutated parts. When the circular parts are thus moved out of engagement with the spring-actuated parts, the action of the coiled spring Y, Fig. 10, revolves the carrier X and carries the circular parts around against the auxiliary key, which then acts as a stop until the gatings of the tumblers are all in line. The circular parts are then in proper position for re-engagement with the spring-actuated parts, which are operated by the main locking-key, and which are set to different combinations, according as one or another key is used, as hereinafter described. At the same time that the circular parts are moved out of engagement with the spring-actuated parts the latter will turn by force of their springs against the main-key hub, which serves as a stop for them whenever disengaged from their circular parts. Any desired main key can now be inserted, turned as if to unlock, and the parts of the tumblers again be engaged by oscillating them by means of the thumb-nut *d*. The thumb-nut can then be screwed to place and the auxiliary lock-key withdrawn, and the lock will be set and locked to a new combination. All this is the work of but a moment, and is so simple that no error can occur, because the auxiliary lock-key cannot be withdrawn until a proper engagement of the tumblers on a new combination is effected and the spring-actuated tumblers cannot be engaged with the circular tumblers until the main key has been turned in the direction for unlocking. The reason of this is that the springs throw the pivoted parts of the tumblers entirely out of position to engage with the circular parts until the main key has moved them into proper position. I thus provide a lock well adapted for post-office-box doors, and many other uses capable of a vast number of different combinations, depending upon the number of tumblers employed, which can be readily and quickly set for any given combination of the series, which is not exposed to wear in such a way as to derange the adjustment or registration of the parts of the tumblers, and which is simple and reliable in operation.

I have shown but two means of locking or fastening the parts of the tumblers together; but it is obvious that various fastening means might be employed, and my invention does not depend upon any particular means to be employed for the purpose. The main thing is to have the two parts of the tumblers securely held in engagement during all the ordinary uses of the lock, yet capable of being disengaged and separated whenever it is desirable to change the key and the combination for operating the lock. When the parts of the tumblers are separated, any main key which will fit the key-hub and is within the extensive number of combinations possible in its bitings can be used to turn the spring-actuated parts of the tumblers, as in unlocking, when they will be in position for engagement with the teeth of the circular parts. After such engagement no key except the one used for changing the combination will unlock the lock.

It is not material to the principle of operation of my invention how or by what movement the two parts of the tumblers are separated, and although several tumblers are shown the principle of my invention would be exemplified by the use of a single tumbler in two separable parts.

What I claim as new is—

1. In a changeable-combination key-lock having two-part tumblers, the combination, with a movable seat which supports one part of said tumblers, of an auxiliary key which disengages one part of the tumbler or tumblers from the other, and a cap-plate through which said key passes, whereby said key cannot be removed from the lock until said parts are in engagement, substantially as described.

2. In a changeable-combination key-lock having two-part tumblers, the combination of an auxiliary key with the gated parts of the tumblers and a spring-actuated carrier upon which said parts are mounted, whereby said parts, when separated from the spring-actuated parts, tend to move against said auxiliary key, acting as a stop until the gatings of said tumblers are brought in line, substantially as described.

3. The combination, with the circular parts of the tumblers, of a pivoted frame for supporting them, adapted to be swung to one side or the other, so as to engage and disengage the circular parts of the tumblers with the other parts, substantially as set forth.

4. The combination of the oscillating seat Z, the carrier, the circular parts of the tumblers, pivot-post *h*, the slotted key-post, the cap-plate, the thumb-nut *d*, and the spring-latch *l*, substantially as set forth.

5. The combination, with the slotted key-post, of the cap-plate provided with the slots *k k'* and the key *g*, tapered at its end, and notch *m*, substantially as set forth.

6. In a changeable-combination key-lock, the combination of a main locking-key and a rotary key-hub with tumblers made in separable parts and connected together at all times except when the combination is to be changed, substantially as set forth.

7. In a changeable-combination key-lock, the combination, with separably-connected tumblers, one set of which is mounted on a pivoted frame, of the lock-bolt, the slide I, and the key-hub L, which, when the key has set the tumblers and the rotation of the key-hub is continued, will engage with the slide I and cause the fence to enter the gatings of the tumblers and retract the lock-bolt without separating the tumblers, substantially as set forth.

8. In a changeable-combination key-lock with separably connected tumblers, the combination of the locking device for keeping the tumblers in contact and the auxiliary key for releasing them when the lock is to be set by a different main key, substantially as set forth.

9. In a changeable-combination key-lock provided with separably-connected tumblers which are always connected except when the combination is to be changed, the combination of a fence and a lock bolt or latch which can be retracted independently of the tumblers without the tumbler-fence entering the gating, and which can be withdrawn by the key when the gatings become properly set for the tumbler-fence to enter them, substantially as set forth.

10. In a changeable-combination key-lock provided with separably-connected tumblers which are always connected together except when the combination is to be changed, a section of tumblers, and means independent of the motion of the operating-key for automatically bringing their fence-gatings into alignment to be connected with the other section of tumblers, substantially as set forth.

WARREN H. TAYLOR.

Witnesses:
ALEXANDER CRAMOND.
G. W. RIKER.